Jan. 24, 1928.　　　　　　　　　　　　　　　　1,657,160
C. J. V HENTSCHELL ET AL
PROCESS AND APPARATUS FOR USE IN CONNECTION WITH FLONGS
Filed Jan. 24, 1927　　　　2 Sheets-Sheet 1
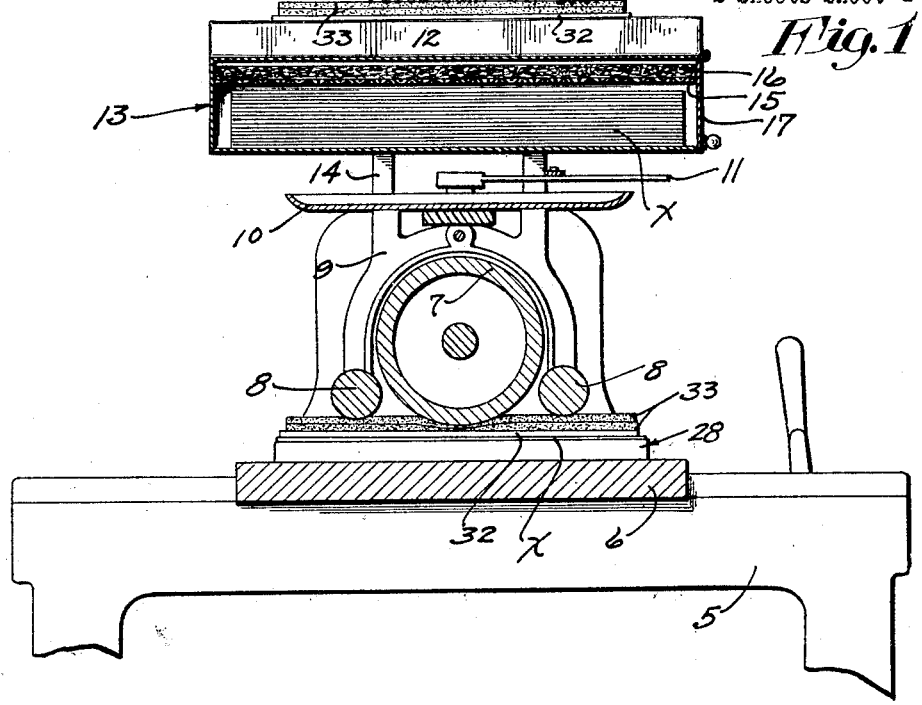
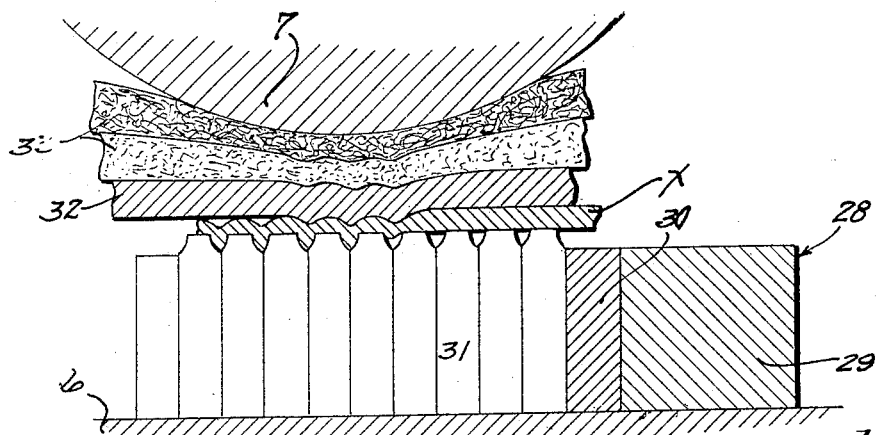
Inventors
Charles J. V. Hentschell
George H. Wheldon
By their Attorneys
Merchant and Kilgore Jan. 24, 1928.   1,657,160
C. J. V HENTSCHELL ET AL
PROCESS AND APPARATUS FOR USE IN CONNECTION WITH FLONGS
Filed Jan. 24, 1927    2 Sheets-Sheet 2
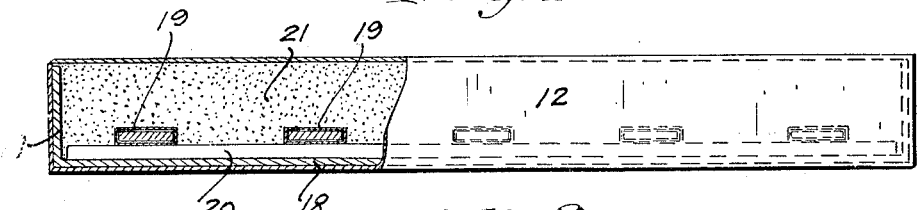
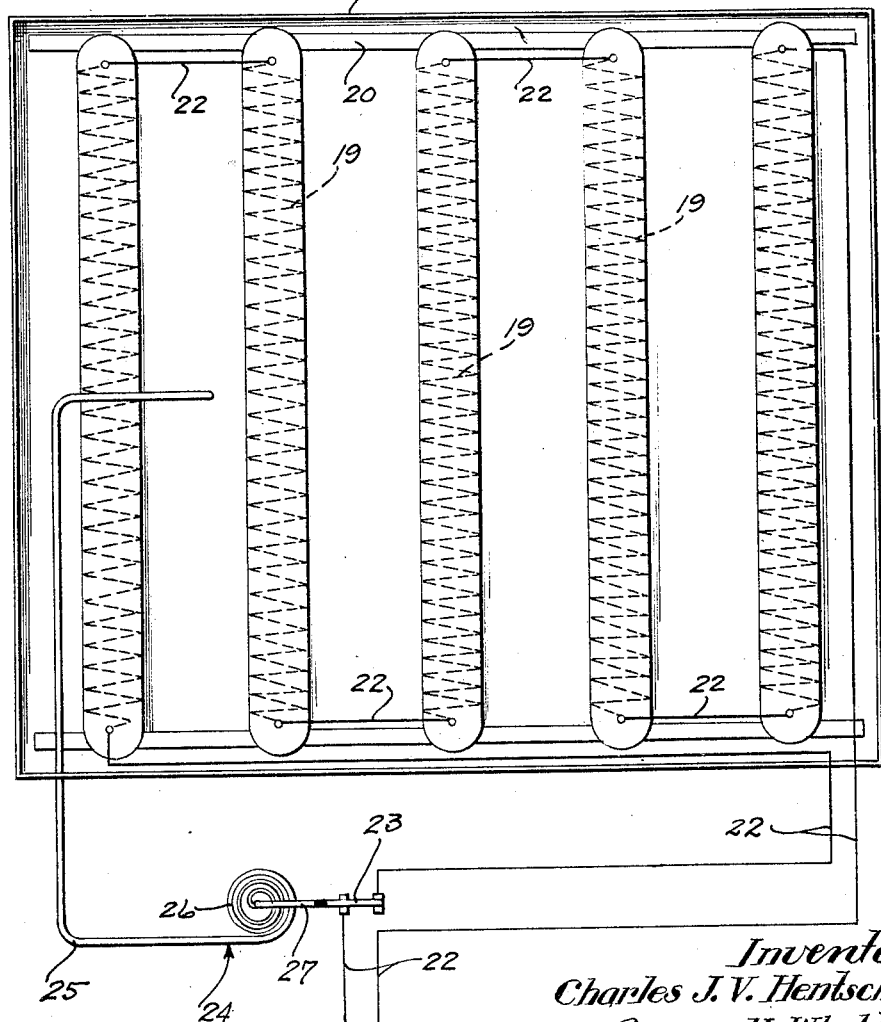
Inventors
Charles J. V. Hentschell
George H. Wheldon
By their Attorneys
Merchant and Kilgore Patented Jan. 24, 1928.

1,657,160

UNITED STATES PATENT OFFICE.

CHARLES J. V. HENTSCHELL AND GEORGE H. WHELDON, OF MINNEAPOLIS, MINNESOTA, ASSIGNORS OF ONE-FOURTH TO JOSEPH E. MURPHY AND ONE-FOURTH TO WILLIAM HALL, BOTH OF MINNEAPOLIS, MINNESOTA.

PROCESS AND APPARATUS FOR USE IN CONNECTION WITH FLONGS.

Application filed January 24, 1927. Serial No. 163,134.

Our invention relates to stereotype casting matrices, and more particularly to an improved apparatus for use in heating molding blankets, and an improved process which includes the heating of such a blanket and its application while hot to the back of a dry flong, commonly called a mat, applied to a type form, and in squeezing said flong by pressure applied to the blanket to form a matrix. Said process further includes the covering of the molding blanket with one or more secondary molding blankets, which not only hold the heat in the primary molding blanket while being heated but are themselves heated. These hot secondary molding blankets are applied to the back of the primary molding blanket, and in addition to their function in assisting in the molding of the matrix, insulate the primary molding blanket from the roller or platen of the matrix molding machine.

In producing a matrix from which a stereotype plate is to be formed, it is now the general practice to use a dry flong for making a matrix from a type form, after the same has been subjected to moisture, so that it will be more readily squeezed into the depressions in said form and shape itself around the type faces under pressure applied thereto. This flong is laid on the type form, and on the back of said flong is laid a primary molding blanket formed from ground cork and held formed by a suitable binder. On the back of the primary molding blanket is laid one or more secondary wool felt or fibrous molding blankets. Said flong and molding blankets are then subjected to pressure and the function of the cork molding blanket is to squeeze the flong into the depressions in the type form and around the type faces to form a matrix.

Cork molding blankets, as now used in connection with dry flongs, are not very satisfactory, after little use, as they do not cause the dry flong to produce a matrix of the proper depth with a sharp impression and a perfect face with minimum pressure, which is highly essential in making a perfect matrix, for the reason that said blankets have very little life or elasticity and hence do not resume their original form after being distorted by the irregular surfaces of type forms, and furthermore they are comparatively brittle and easily broken and hence it is evident that a rough and broken cork molding blanket will not press a dry flong to the proper depth into all of the depressions in a type form and around the type faces. As the life of a cork molding blanket, as now used, is comparatively short, the expense of replacing the same is considerable.

Our improved process includes the heating of a cork molding blanket and the use of the same while hot for the purpose of putting life into said blanket which increases its elasticity so that it will be more readily distorted and press the flong into the depressions in a type form and around the type faces, and while thus distorted by pressure during the formation of a matrix, will resume its original shape when the pressure is removed, thus leaving the cork molding blanket in its original form. This heating of the cork molding blanket also makes the same less brittle and hence the life thereof is materially increased.

By the use of our improved process, deeper and sharper impressions are produced in a dry flong with less pressure, which is highly essential in producing a perfect matrix, and also the life thereof is materially increased. As less pressure is required in making a matrix under our process, less damage is done to the type and hence the life thereof is materially increased. The results obtained by the use of our improved process gives a uniform casting plane to a matrix, which in turn gives a uniform printing plane to a stereotype plate made from the matrix.

In the accompanying drawings, which illustrate the invention, like characters indicate like parts throughout the several views.

Referring to the drawings:

Fig. 1 is a view principally in longitudinal central section showing a matrix roller molding machine on which the improved apparatus is mounted;

Fig. 2 is a view, on an enlarged scale, in section showing certain parts illustrated in Fig. 1 and illustrating the formation of a matrix;

Fig. 3 is a view of the improved apparatus in plan with some parts removed and diagrammatically illustrating a wiring diagram and heating elements; and Fig. 4 is a side elevation of the parts shown in Fig. 3, with some parts broken away and other parts sectioned.

In the drawings there is shown a matrix roller molding machine of well known construction, and of the parts thereof illustrated, it is important to note the frame 5, travelling bed 6, pressure roller 7, smoothing rollers 8, bearing brackets 9, in which said rollers are journaled, cover plate 10, and pressure lever 11.

Referring now in detail to the improved apparatus, the numeral 12 indicates a hollow heating table, the top of which affords a supporting surface on which the molding blankets are heated. The top member of this table 12 is made displaceable to afford access to the interior of said table. This table 12 is supported on a metallic humidifying cabinet 13, which in turn is supported over the molding machine on supplemental end brackets 14, forming extensions of the bearing brackets 9. This cabinet 13 is for the storage of moistened matrix-forming dry flongs x. It may be here stated that these flongs x when received from the producer, are dry and before they can be used in making a matrix, moisture must be induced therein in order that said flongs, when squeezed onto type forms, will enter the depressions therein.

To keep the flongs x in the same moist condition in which they are placed in the cabinet 13, said cabinet is provided above said flongs with a shelf 15, in the form of a screen, on which is removably mounted a moisture-containing pad 16 of felt or other suitable absorbent material. Any suitable means may be used for keeping the pad 16 supplied with moisture.

The cabinet 13 is provided with a door opening normally closed by a gravity-closed door 17, and through which opening the flongs x and pad 16 may be placed in the cabinet 13 or removed therefrom. The entire internal surface of the table 12, with the exception of its top member or blanket-supporting surface, is covered with an insulating material 18.

Within the hollow table 12 is a plurality of edgewise spaced electrical heating elements 19 which rest on longitudinally extended mounting strips 20 laid on the bottom insulation 18. Said hollow table 12 is filled with sand 21 or other heat-conducting material for the purpose of evenly distributing the heat over the top member of the table 12.

An electric circuit 22 for the heating elements 19, as diagrammatically illustrated in Fig. 3, has interposed therein a switch 23 for making and breaking said circuit. This switch 23 is automatically controlled for keeping the top of the table 12 at a predetermined temperature by a thermostat 24 which may be of any suitable form and, as diagrammatically shown, comprises a heat-conducting tube 24, one end portion of which extends into the table 12 and is embedded in the sand 21, and the other end portion thereof is shaped to form a spiral coil 26 having an arm 27 to which the switch 23 is rigidly secured and insulated therefrom.

Supported on the travelling bed 6 is a type form 28 comprising a chase 29, a chase wedge 30, and type 31.

As previously stated, the cork molding blanket and one or more, as shown, molding blankets of wool felt are used in connection with one of the conditioned flongs x for making a matrix, and which blankets are indicated in Fig. 2 by the numerals 32 and 33, respectively. In carrying out the improved process, the cork molding blanket 32 is laid on the top of the table 12 and covered with the molding blankets 33, and kept heated to a predetermined temperature controlled by the thermostat.

To make a matrix from the type form 29, one of the flongs x is removed from the cabinet 13 and laid on said form and then the hot cork molding blanket 32 and the wool felt molding blankets 33 are removed from the heating table 12 and laid, the former on the back of the flong x and the latter on the back of said cork blanket. The travelling bed 6 is then operated and moved under the rollers 7 and 8 and the pressure exerted by the roller 7 on the hot molding blankets 32 and 33 squeezes the flong x into the depressions in the faces of the type 31 and produces a matrix, as heretofore stated. The wool felt molding blankets 33 while covering the cork molding blanket 32 on the heating table 12 hold the heat in said cork blanket and when in the molding machine insulate said cork blanket from the roller 7 and keep the same from getting cold.

What we claim is:

1. The process of forming a matrix from a dry flong which consists in subjecting the flong to moisture and applying the same while moist to a form, in heating a molding blanket and applying the same to the back of the flong, and in subjecting the flong and blanket to pressure on the form while said blanket is hot.

2. The process defined in claim 1 in which the molding blanket is heated to a predetermined temperature, and in using the same while at substantially the same temperature.

3. The process of forming a matrix from a dry flong which consists in subjecting the flong to moisture and applying the same while moist to a form, in heating a flexible molding blanket and applying the same to the back of the flong, and in subjecting the flong and blanket to pressure on the form while said blanket is hot.

4. The process of forming a matrix from a dry flong which consists in subjecting the flong to moisture and applying the same while moist to a form, in covering a flexible molding blanket with a fibrous molding blanket, in heating said blankets and applying said blankets, the former to the back of the flong and the latter to the back of the flexible molding blanket, and subjecting the flong and blankets to pressure while said blankets are hot.

In testimony whereof we affix our signatures.

CHARLES J. V. HENTSCHELL.
GEORGE H. WHELDON.